US005781906A

United States Patent [19]
Aggarwal et al.

[11] Patent Number: 5,781,906
[45] Date of Patent: Jul. 14, 1998

[54] SYSTEM AND METHOD FOR CONSTRUCTION OF A DATA STRUCTURE FOR INDEXING MULTIDIMENSIONAL OBJECTS

[75] Inventors: Charu Chandra Aggarwal, Cambridge, Mass.; Joel Leonard Wolf, Katonah; Philip Shi-lung Yu, Chappaqua, both of N.Y.

[73] Assignee: International Business Machines Corporation, Armonk, N.Y.

[21] Appl. No.: 660,047

[22] Filed: Jun. 6, 1996

[51] Int. Cl.$^6$ .................................................. G06F 17/30
[52] U.S. Cl. ........................... 707/102; 707/100; 707/3; 707/2; 707/1; 364/282.1; 364/282.3; 341/51
[58] Field of Search ............................ 707/102, 100, 707/1, 3, 2; 364/282.1, 282.3; 341/51

[56] References Cited

U.S. PATENT DOCUMENTS

| | | | |
|---|---|---|---|
| 4,944,023 | 7/1990 | Imao et al. | 382/37 |
| 5,319,743 | 6/1994 | Dutta et al. | 395/133 |
| 5,533,148 | 7/1996 | Sayah et al. | 382/240 |
| 5,572,634 | 11/1996 | Duluk | 395/119 |
| 5,647,058 | 7/1997 | Agrawal et al. | 707/1 |
| 5,694,591 | 12/1997 | Du et al. | 707/2 |

OTHER PUBLICATIONS

Naylor, B., "Binary space partitioning trees, A Tutorial", ACM SIGGRAPH 94, Jul. 1994.
Karmel et al., "On packing R-trees", ACM, pp. 490–499, Nov. 1993.
Sellis et al., "A Dynamic Index for Multi-Dimensional objects", Proceeding of the 13th VLDB conference, Jan. 1987.
T. Sellis et al., "The R+–Tree: A Dynamic Index for Multi-Dimensional Objects", Proceedings of the 13th VLDB Conference, Brighton 1987, pp. 507–518.
Maurice Frank, "Future Database Technologies Now", Issue DBMS, M&T Publishing, Inc., No. 12, V. 8, Nov. 1995, pp. 52–54, 56 & 58.

I. Kamel and C. Faloutsos, "On Packing R–trees", 1993, ACM 0–89791–626–3/93/0011, pp. 490–499.

A. Guttman, "R–Trees: A Dynamic Index Structure for Spatial Searching", 1984, ACM 0–89791–128–8/84/006/0047, pp. 47–57.

N. Beckman et al., "The R*–tree: An Efficient and Robust Access Method for Points and Rectangles+", 1990, ACM 089791–365–5/90/0005/0322, pp. 322–331.

*Primary Examiner*—Thomas G. Black
*Assistant Examiner*—Jean M. Corrielus
*Attorney, Agent, or Firm*—Heslin & Rothenberg, P.C.

[57] ABSTRACT

An apparatus and a method for constructing a multidimensional index tree which minimizes the time to access data objects and is resilient to the skewness of the data. This is achieved through successive partitioning of all given data objects by considering one level at a time starting with one partition and using a top-down approach until each final partition can fit within a leaf node. Subdividing the data objects is via a global optimization approach to minimize the area overlap and perimeter of the minimum bounding rectangles covered by each node. The current invention divides the index construction problem into two subproblems: the first one addresses the tightness of the packing (in terms of area, overlap and perimeter) using a small fan out at each index node and the other one handles the fan out issue to improve index page utilization. These two stages are referred to as binarization and compression. The binarization stage constructs a binary tree such that the entries in the leaf nodes correspond to the spatial data objects. The compression stage converts the binary tree into a tree for which all but the leaf nodes and the parent nodes of all leaf nodes have branch factors of M. In the binarization stage, a weighting or skew factor is used to achieve flexibility in determining the number of data objects to be included in each of the partitions to obtain a tree structure with desirable query performance. Thus the index tree constructed is not required to be height balanced. This provides a means to trade-off imbalance in the index tree in order to reduce the number of pages which need to be accessed in a query.

37 Claims, 10 Drawing Sheets

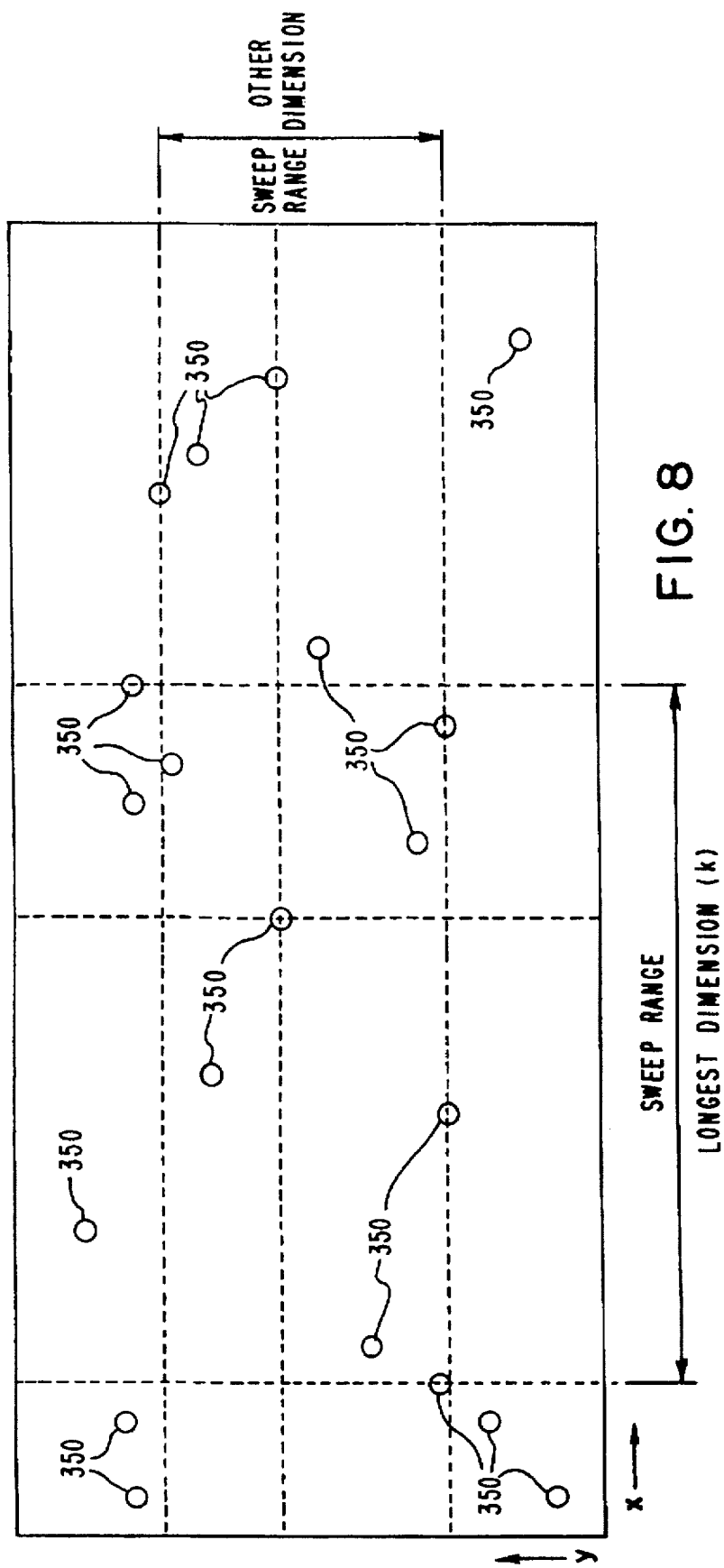

SYSTEM AND METHOD FOR CONSTRUCTION OF A DATA STRUCTURE FOR INDEXING MULTIDIMENSIONAL OBJECTS

The present invention was made under contract NCC5-101, granted by the National Aeronautics and Space Administration/Cooperative Agreement Notices (NASA/CAN). The Government has certain lights in the present invention.

I. BACKGROUND

1. Field of the Invention

The present invention relates to the generation of an improved data structure for indexing multidimensional data objects stored in a data base.

2. Related Art

The need for efficient storage and retrieval of multidimensional objects is increasing as various applications in multimedia, digital libraries, virtual reality and information warehousing become popular. Typical two-dimensional objects include cartographic maps of countries and bands of satellite imagery. Typical 3-dimensional objects include medical images, such as MRI brain scans. These applications require the storage of data objects, some of which may be point sets while others may have non-zero measure. Such multidimensional or spatial data objects are not generally well represented by traditional structures, such as B-trees, which use a 1-dimensional ordering of key values. Multidimensional (also called spatial) data structures are well known in the art. See for example, *The Design and Analysis of Spatial Data Structures*, by H. Samet, Volumes 1 and 2, Addison-Wesley (1989), which is hereby incorporated by reference in its entirety.

R-trees, which were first proposed in *R-Trees: A Dynamic Index Structure for Spatial Searching*, Proceedings of the ACM SIGMOD Conference (1984), by A. Guttman, are one method for dealing with data containing point sets and/or objects of non-zero measure. R-trees can be considered as a multidimensional extension of B-trees. The resulting data structure has the form of a height balanced tree in which each leaf node contains between m and M index records, where $2 \leq m \leq M/2$, and each internal node except for the root contains between m and M children. Each leaf node of this R-tree contains record entries which are of the form (I, object-identifier). Here I is the minimum bounding rectangle (MBR) of the data object (that is, the smallest box parallel to the axes in n-dimensional space which contains the object). The structure of an internal node entry is slightly different in that the entries are of the form (I, pointer). Here, pointer contains the address of a lower node in the R-tree, and I is the minimum bounding rectangle of the set of data objects in the leaf node entries which are descendants of that node. This data structure tends to provide excellent space utilization and good computational performance. (The value of M is a design choice, and may not correspond to precisely 100% page utilization, in order to accommodate future insertions.)

An important goal when constructing an index tree is to minimize the access time, i.e. the average number of index pages that a given query must access. Thus, to achieve the best possible performance in an index structure for multidimensional objects, the following three design objectives are considered:

(1) Area: The areas of the minimum bounding rectangles (MBR) corresponding to the different nodes must be kept small, because the probability that a particular node may be accessed increases with increasing area.

(2) Overlap: An equally critical factor is the overlap between different minimum bounding rectangles. Overlapping is generally undesirable, as it requires searching through multiple sibling subtrees when the desired object is in the overlapped regions. Furthermore, overlap often occurs in densely populated regions of the database, which are also frequently accessed.

(3) Perimeter: For region queries, it is desirable that the minimum bounding rectangles be as square as possible. It is also important that the perimeter of the minimum bounding rectangles be as small as possible.

A region query may be defined as follows: Given an aligned rectangle (that is, a box in K-dimensional space parallel to the axes), find all data objects which intersect it. Point queries are the special case of region queries in which the aligned rectangle is a single point.

Motivation for and discussion of the above design objectives may be found in *The R\*-Tree: An Efficient and Robust Method for Points and Rectangles*, Proceedings of the ACM SIGMOD Conference (1990), by N. Beckman, H. Kriegel, R. Schneider and B. Seeger ("Beckman") and in *On Packing R-trees*, Proceedings of the 2nd International Conference on Information and Knowledge Management (1993), by I. Kamel and C. Faloutsos.

A number of variants of R-trees have been proposed which can provide better performance depending upon the nature of the data. These include the R\*-trees in Beckman and in *The R+ tree: A Dynamic Index Structure for Multi-Dimensional Objects*, Proceedings of the 13th International Conference on VLDB (1987), by T. Sellis, N. Roussopoulos and C. Faloutsos.

The initial construction (or packing) of the index tree is a controlling factor in performance. This is especially true when a large majority of the data objects are known before the index is constructed, for example when the database is static rather than dynamic in nature. A common approach to constructing an index tree for multidimensional objects is to insert the data objects into the tree one at a time starting from an empty tree. When a data object is inserted into the tree from the root, a path to the final leaf node containing the data object is selected. The intermediate nodes on the path and the leaf node are selected to optimize the area, overlap and perimeter of the bounding rectangles as discussed before. This type of packing approach is basically incremental. It uses only local information, and does not take advantage of the available global knowledge of all data objects present. In other words, it does not see the 'big picture', and suffers accordingly. As a result, the performance of the index tree depends upon the arbitrary order of the insertions.

Recently, a new approach for packing index trees (given global knowledge of all data objects present) was proposed in *On Packing R-trees*, Proceedings of the 2nd International Conference on Information and Knowledge Management (1993), by I. Kamel and C. Faloutsos. It uses a space-filling Hilbert curve to linearly order data objects in a k-dimensional space. The data objects are then used to fill-up the nodes and construct the index tree in a bottom-up fashion. The resultant index tree is referred to as a Hilbert-packed R-tree. Specifically, the data objects are assigned to the leaf nodes according to their order derived from the Hilbert curve. Each leaf node (except the last one) contains exactly M objects. These nodes again are assigned in order to the nodes in the next higher level of the index tree. The process continues until there is only one node left after the assignment, which is the root of the index tree.

There are drawbacks to the linear ordering method for multidimensional objects and the bottom-up approach employed in the packing method. For example, because the Hilbert curve linearly orders the data objects, two or more spatially close objects may be inserted far apart in terms of the index tree. This results in increased MBR areas and overlap.

Another drawback results from the fact that real data is often skewed. Consequently, there are typically regions of very high density as well as large regions of very low density. Using a bottom-up packing method to build the index tree will result in a high degree of overlap among the MBRs. Generally speaking, a perfectly height-balanced index tree is suboptimal for indexing skewed data. The present invention addresses these drawbacks.

II. SUMMARY

The present invention, in accordance with the aforementioned needs, is directed to a system and method of constructing a multidimensional index tree ("S-tree") which requires less time to access data objects and reduces MBR overlap, regardless of data skew.

Accordingly, a system and method having features of the present invention includes a successive partitioning of all given data objects by considering one level at a time starting with one partition and using a top-down approach until each final partition can fit within a leaf node. Subdivision of data objects is via a global optimization approach which advantageously minimizes the overlap, area and perimeter of the MBRs.

The present invention divides the index construction or packing problem into two steps. The first (binarization) step optimizes packing density (i.e. minimizes area and overlap of the MBR covered by each index node) but uses a small fan out (say 2) at each index node. The second (compression) step optimizes fanout to improve index page utilization by increasing the fanout as nearly as possible to a predetermined value. A process having features of the present invention comprises two steps:

(1) Binarization: In this stage a binary tree is constructed such that the entries in the leaf nodes correspond to the multidimensional (also called spatial) data objects. Thus, all non-leaf nodes have branch factors of 2, where the branch factor (also called fanout) of a node is defined as the number of children of that node.

(2) Compression: In this stage the binary tree is converted top-down into a tree for which all but the leaf and penultimate nodes have branch factors of M, where a node is said to be penultimate if all of its children are leaf nodes. This is achieved by iteratively compressing pairs of non-leaf parent and child nodes in the tree into single nodes.

According to another aspect of the present invention, a weighting or skew factor p may be used in the binarization stage to achieve flexibility in determining the number of data objects to be included in each of the partitions. The skew factor thus provides a means to trade imbalance in the index tree to reduce the number of pages which need to be accessed in a query.

According to still another aspect of the present invention, a sweep process is used in the binarization step to find the optimum division line to create the partitions. Preferably, the sweep process chooses the partition with minimal total area. According to still another aspect of the present, an overlap factor o may be used to control the sweep process. For example, to choose a partition having the smallest total area without overlap, or alternatively the one with the smallest relative overlap. According to yet another aspect of the present invention, by choosing an increment of M in the sweep process, the leaf nodes may be more fully utilized.

According to still another aspect of the present invention, a precompression process advantageously optimizes penultimate non-leaf node utilization by compressing bottom-up one level prior to the top-down compression process.

III. BRIEF DESCRIPTION OF THE DRAWINGS

These and other features and advantages of the present invention will become apparent from the following detailed description of the invention taken in conjunction with the accompanying drawings, wherein:

FIG. 4b is a flow chart of the sweep process of FIG. 4a;

Figure 2:
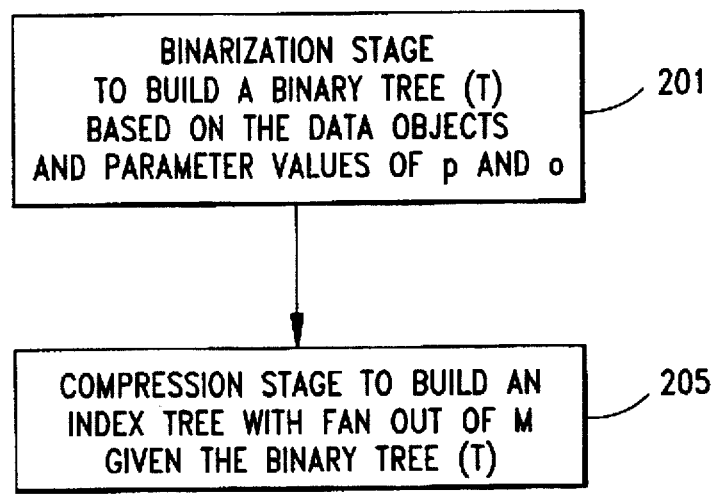
FIG. 2 is a block diagram of a computerized method for constructing a tree data structure for indexing multidimensional objects in accordance with the present invention.
Figure 5:
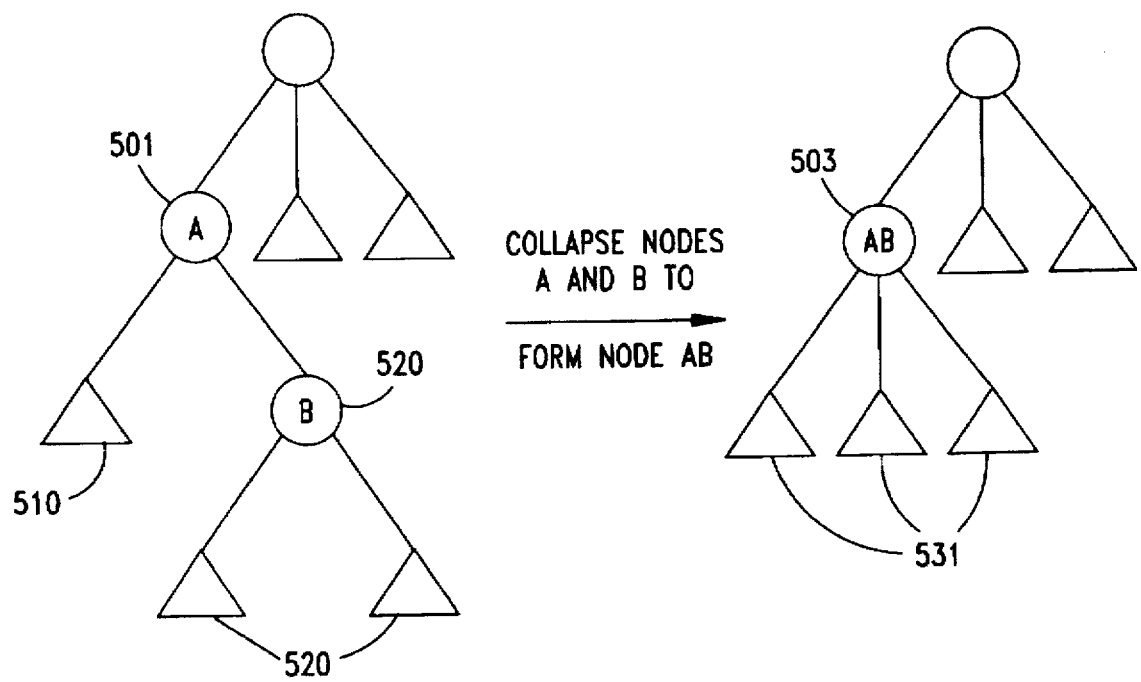
Figure 6:
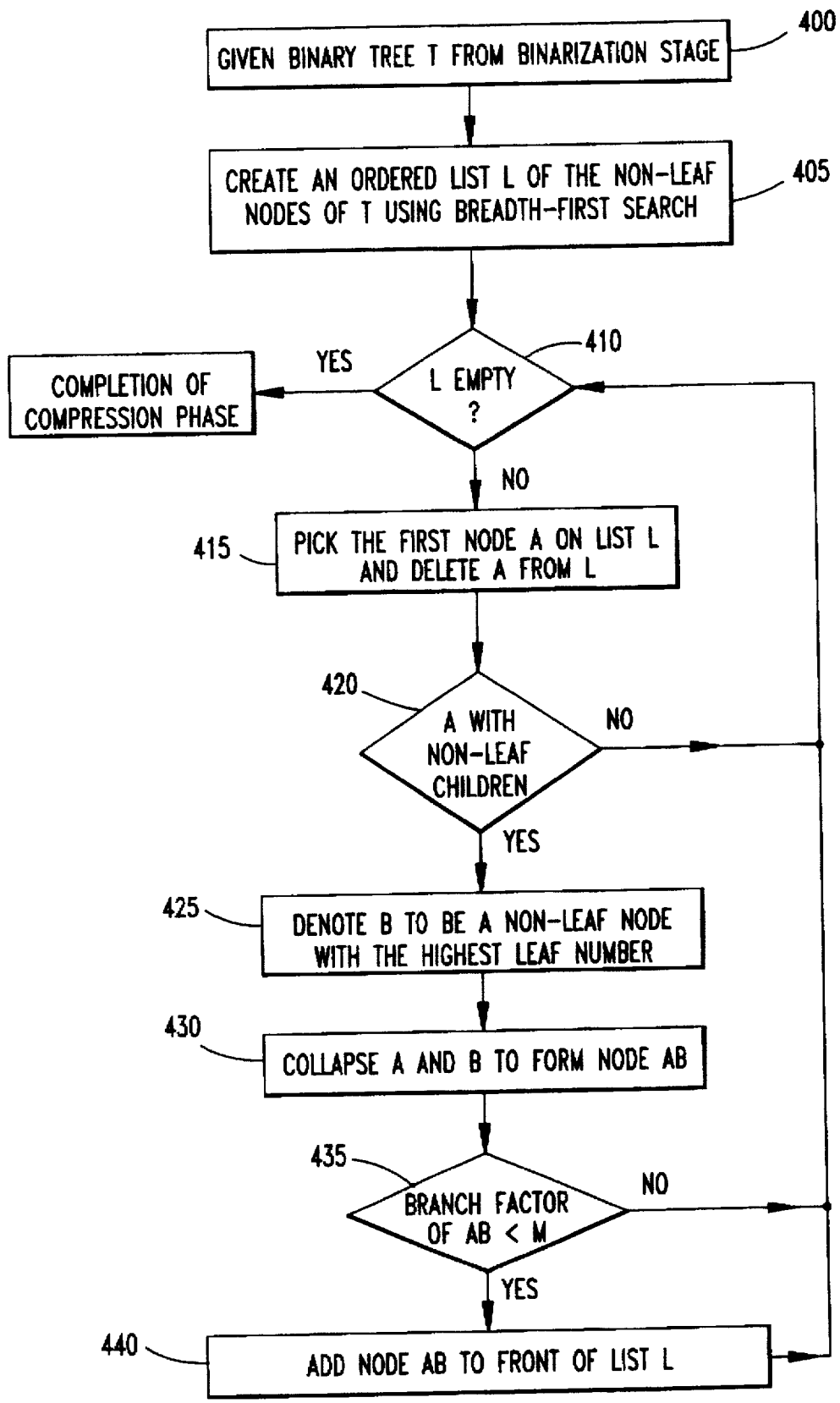
Figure 7:
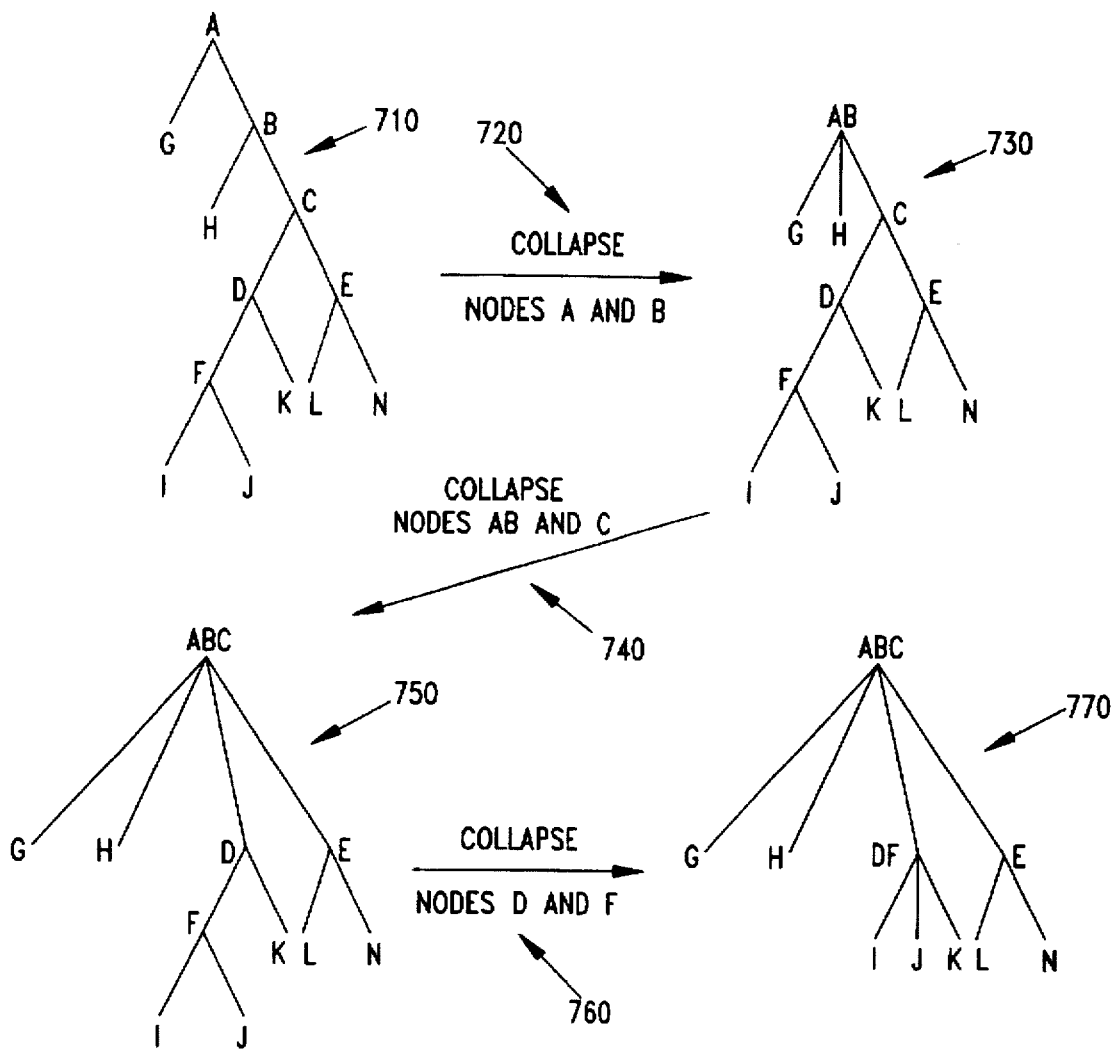
Figure 9A:
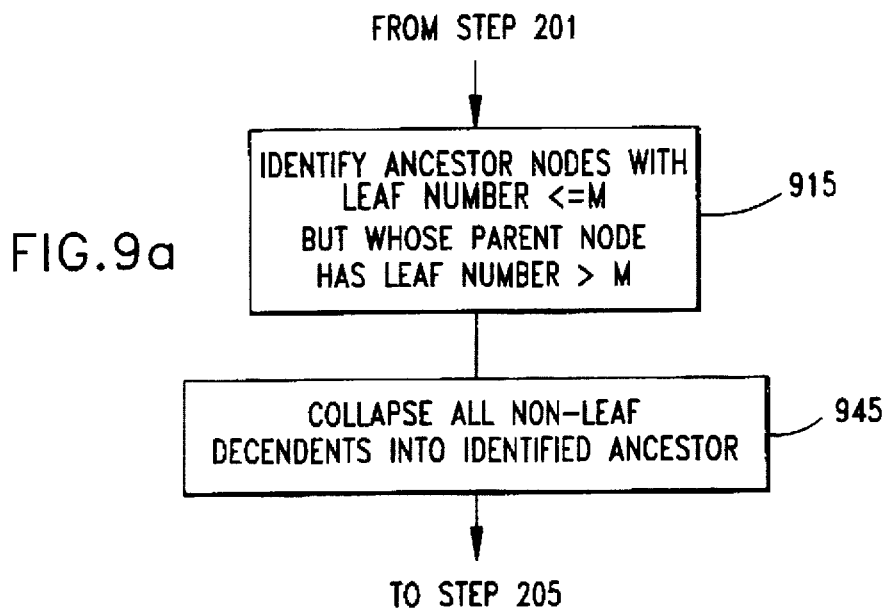
Figure 9B:
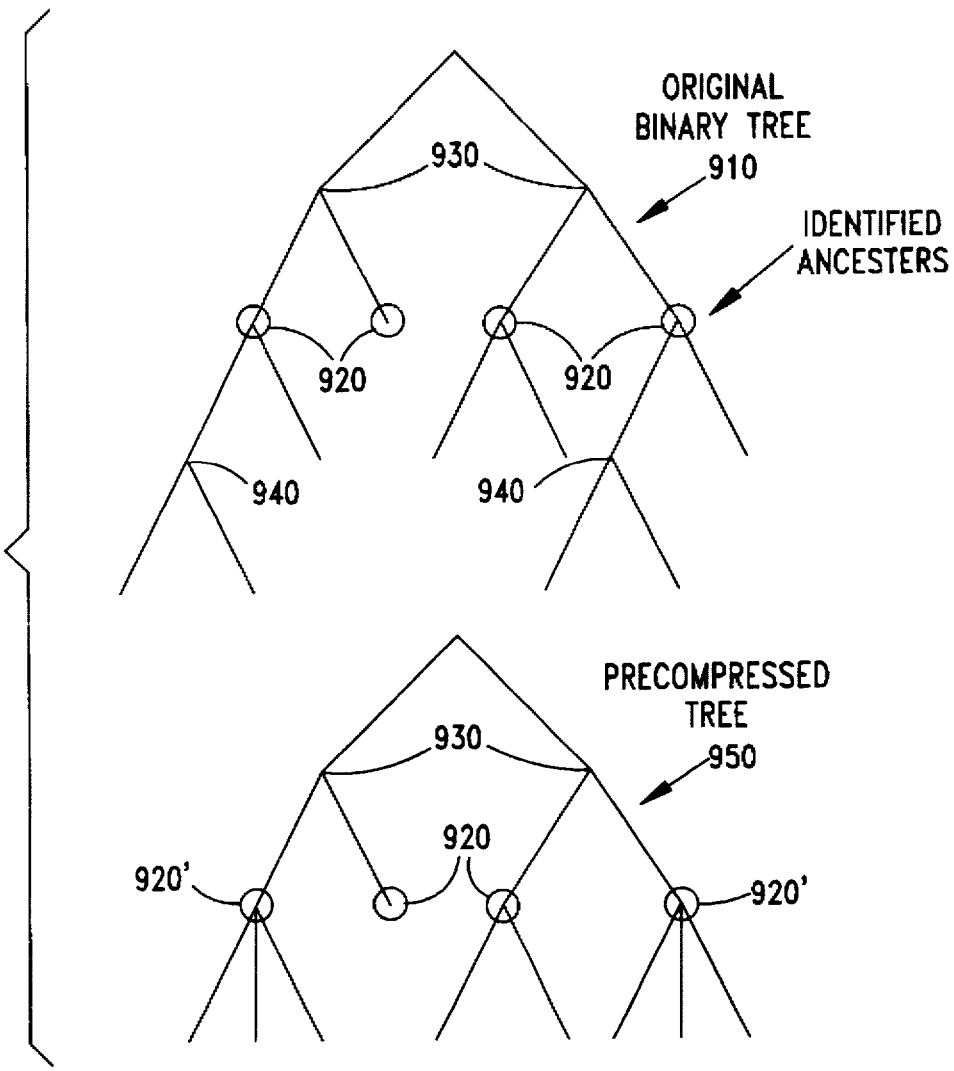

FIG. 5 visually illustrates features of the compression step of FIG. 2;

FIG. 6 is a flow chart showing a more detailed example of the compression step of FIG. 2;

FIG. 7 visually illustrates an example of the compression process of the FIG. 6;

FIG. 8 visually illustrates additional features of the sweep process of the binarization step;

FIG. 9a is a flowchart of a precompression step in accordance with the present invention; and FIG. 9b visually illustrates the precompression step of FIG. 9a.

IV. DETAILED DESCRIPTION OF A PREFERRED EMBODIMENT

Figure 1:
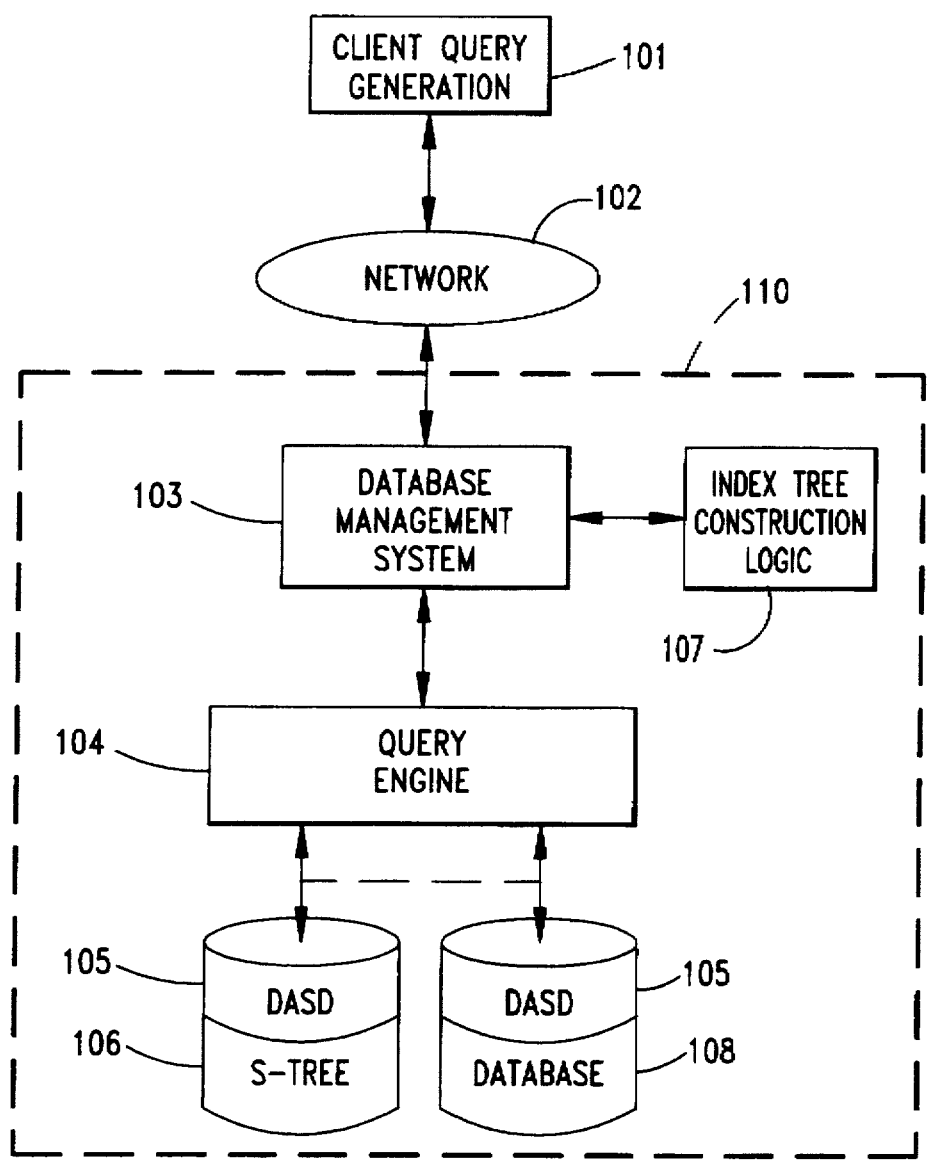
FIG. 1 is a block diagram of a computer system having features of the present invention.

FIG. 1 depicts a client/server architecture including a database management system capable of supporting multi-dimensional object indexing as an access method in accordance with the present invention. As is conventional, the client 101 has the features of a complete, stand-alone personal computer (although it could be a "dumb" terminal found in older architectures). The server 110 could be any one of a number of conventional processors, such as another personal computer, a mini-computer, a mainframe, or one node of a distributed parallel processing system. An operator (human or programmed) typically issues a query from the client 101 through a network 102 to the server 110 which includes a database management system 103 (DBMS). A database management system is typically a layer of software between the physical database 108 and the client. The DBMS typically manages all requests for database action (for example, queries or update requests). The user is thus spared the necessity of keeping track of the physical details of file locations and formats, indexing schemes, etc. Servers and DBMS's are also well known in the art. An exemplary server and DBMS are those sold by IBM under the trademarks 'RS6000' and 'DB2/6000', respectively. Note that in a conventional client/server environment, multiple clients and servers can be configured so that the data in the database 108 is either partitioned or replicated among multiple database management servers. The DBMS includes the index tree construction logic 107 of the present invention (which will be detailed later) for building and maintaining the multidimensional object index tree 106 (also called 'S-tree'). The query is then processed, as is conventional, under the control of software typically referred to as a query engine 104 (also called a search engine or database engine). The query engine searches the database 108 which is stored on stable media such as direct access storage devices (DASD) 105 according to the search criteria specified by or generated from the query. The query could be a key-word based query using a traditional data manipulation language (DML) such as standard Structured Query Language (SQL) or content-based, using increasingly powerful and mainstream Query by Image Content (QBIC) type technology. See *Future Database Technologies Now*, by M. Frank, DBMS, n12, Vol. 8, p. 52, M&T Publishing, (Nov. 1995). As is conventional, the query engine uses the multidimensional object 106 index tree to search or access the database, as appropriate. The query results are then communicated to the requesting client 101 through the network 102.

According to one aspect of the present invention, the index-tree construction logic 107 may include a parameter p, (called the skew factor) of the index-tree. The skew factor p lies in the range [0, ½], where p=½ forces the tree to be well-balanced. An increase in skew (or imbalance) means that on average, the length of a path from the root to a leaf node will increase. Reducing the skew factor may result in greater imbalance but more importantly provides greater design flexibility, and hence lower MBR areas, overlaps and perimeters.

The index tree 106 is constructed to flexibly meet the particular design objectives on area, overlap and perimeter of MBRs. Of course, these objectives may conflict with each other, and aspects of the present invention provide methods for flexibly controlling their relative priorities. Specifically, in the preferred embodiment, the index-tree logic 107 minimizes the total area of the MBRs while constraining the allowable overlap by an overlap factor o. The overlap factor lies in the range [0,1]. These features of the present invention will naturally favor the creation of relatively square, small perimeter MBRs.

Below, a method for the construction of an index tree 106 having a skew factor p and an overlap factor o. Several alternative embodiments and optimizations will subsequently be described.

FIG. 2 depicts a logic flow chart for the construction of an index-tree 106 in accordance with the present invention for an initial set of multidimensional data objects. Given a skew factor p in [0, ½] and an overlap factor o in [0,1], the process consists of two steps as depicted:

(1) Binarization: In step 201, a binary tree is constructed such that the entries in the leaf nodes correspond to multi-dimensional (also called spatial) data objects stored on DASD 105. Thus, all non-leaf nodes have branch factors of 2. Let A be an internal node of the binary tree with children $B_1$ and $B_2$. A skew factor near ½ implies that the tree will be quite well balanced, but may not do as well with respect to some or all of the design objectives.

The leaf number $N_A$ of a node A is defined as the total number of data objects in the leaf descendants of that node. The area of an aligned rectangle I is denoted by A(I). The method ensures that the leaf numbers $N_{B_1}$ and $N_{B_2}$ of each of these children are each at least $p \cdot N_A$. Among all partitions examined which satisfy this leaf number condition, the one chosen minimizes the sum of the areas of the minimum bounding rectangles $A(I_{B_1})+A(I_{B_2})$ subject to a predetermined overlap factor constraint:

$$A(I_{B_1} \cap I_{B_2}) \leq o \cdot (A(I_{B_1})+A(I_{B_2})).$$

Alternatively, if no partition examined satisfies the overlap constraint, the method chooses the partition with the minimum relative overlap;

$$A(I_{B_1} \cap I_{B_2})/(A(I_{B_1})+A(I_{B_2})).$$

(2) Compression: In step 205 the binary tree (T) is converted into a tree for which all but the leaf and penultimate nodes have branch factors of M. This is achieved by iteratively compressing pairs of non-leaf parent and child nodes in the tree into single nodes. The leaf nodes are not affected by this operation.

The binarization and compression steps are now described in detail.

Binarization

The binary tree is constructed in a top-down fashion. (Recall that the packing method for Hilbert-packed R-trees can be classified as a bottom-up approach.) Thus, start with the full set of data objects and partition them into two sets which satisfy the design criteria on area, overlap, and perimeter as described above. Then, each of these two sets of data objects is in turn partitioned using the same method, and so on recursively until arriving at the individual leaf nodes.

Figure 3:
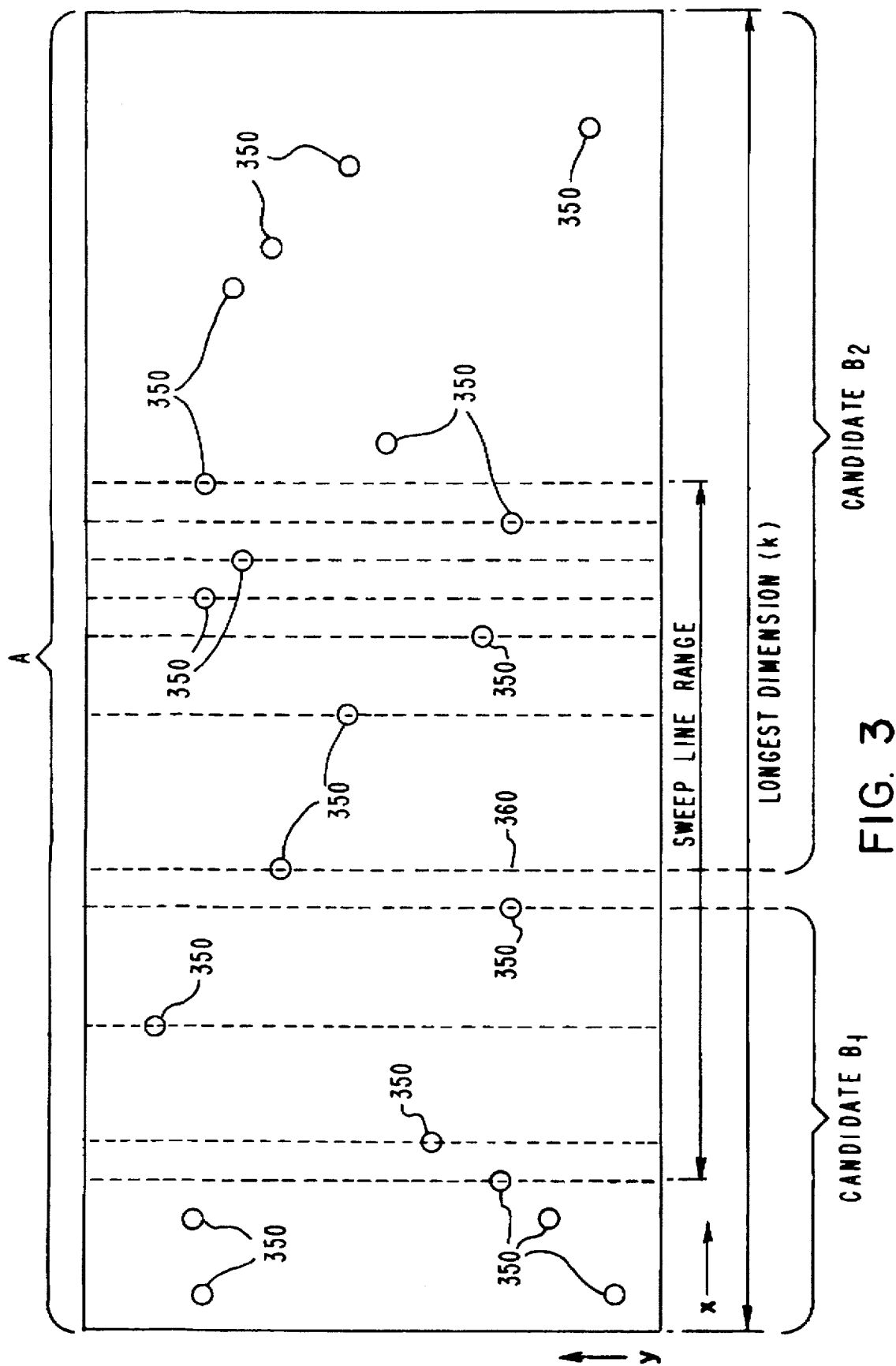
FIG. 3 shows an original node A and candidate partitions used to illustrate the Binarization step of FIG. 2.

Those skilled in the art will appreciate that it is therefore sufficient to describe the binarization process for an arbitrary node A as depicted in FIG. 3. By way of overview, if $N_A \leq M$, (where M is the branch factor and $N_A$ is the leaf number of node A) then node A is made a leaf node and the process stops. Otherwise, a minimum bounding rectangle (MBR) $I_A$ is considered, and a longest dimension k for this rectangle is preferably chosen. (Choosing the longest dimension favors the creation of relatively square minimum bounding rectangles.) Each of the $N_A$ data objects 350 is then represented by their geometric centers, and they are ordered by increasing values of their kth coordinate, i.e., their position in the longest dimension. Candidate partitions $(B_1, B_2)$ considered will have the property that $B_1$ contains the first q data objects according to this order, $B_2$ contains the remaining $N_A-q$ data objects, such that $p \cdot N_A \leq q \leq (1-p) \cdot N_A$.

Figure 4A:
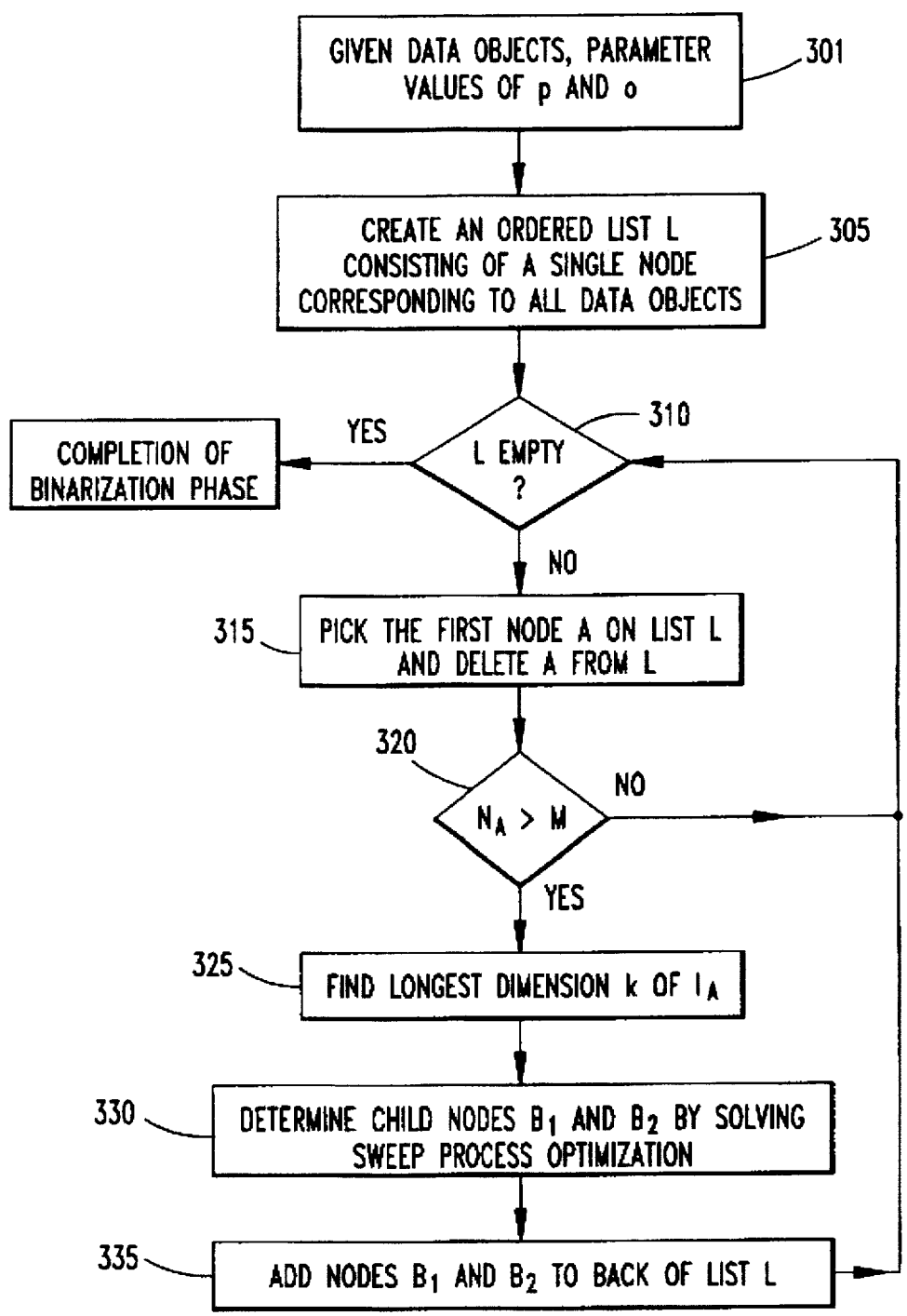
FIG. 4a is a flow chart showing a detailed example of the binarization step.

FIG. 3 shows an original node A and candidate partitions $(B_1, B_2)$ which will be used in conjunction with FIG. 4a to illustrate the Binarization process of step 201. Here, the bounding rectangle is longest in the x-dimension. Assume that overlap factor, p=¼ and that leaf number $N_A$ is 20. Thus, the leaf number condition $(p \cdot N_A)$ requires that $N_{B_1}$ and $N_{B_2}$ must be at least 5.

FIG. 4a depicts a flow chart of the binarization step 201. In step 301, the data objects and input parameters, skew factor p and overlap factor o, are given. An ordered list L consisting of a single node corresponding to all data objects is created in step 305. In step 310, if L is empty, the process is completed. Otherwise, in step 315, the first node, say A, on list L is chosen and removed from L.

In step 320, it is determined if the leaf number $N_A$ is greater than the branch factor M. If the leaf number $N_A>M$, then in step 325 the longest dimension k of $I_A$ is determined. Otherwise, the process returns to step 310, as above. In step 330, the sweep process uses the skew factor p and o (as explained above) to determine the optimal child nodes $B_1$ and $B_2$ of A. In step 335, nodes $B_1$ and $B_2$ are added to the back of list L and the process returns to step 310.

Figure 4B:
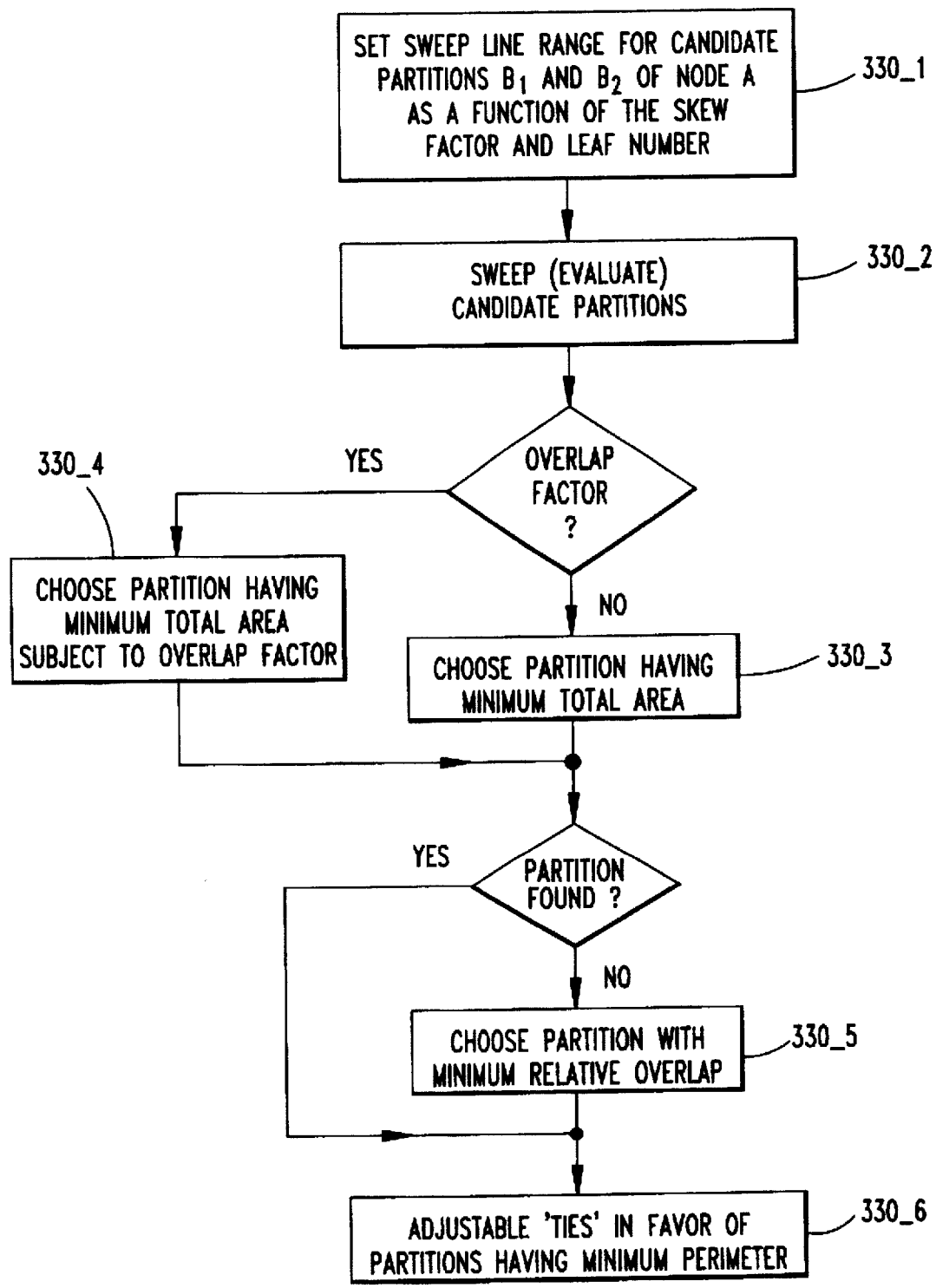

FIG. 4b depicts an example of the sweep process of step 330. Referring also to FIG. 3, the sweep process is used to determine the optimum division line (denoted by dashed lines) to create the partitions $B_1$ and $B_2$. In step 330__1, to satisfy the above leaf number ($N_A$) constraint, the sweep line 360 has a range such that there are at least $p \cdot N_A$ geometric centers of data objects 350 to its left and right, where p is the skew factor. So, there are at most $(1-2 p) \cdot N_A$ centers of data objects 350 remaining as choices for the sweep line to go through. In step 330_2. Sweeping over these $(1-2 p) \cdot N_A$ choices, the sweep process chooses the partition for which the total area is minimized, in step 330_3

$$A(I_{B_1}) + A(I_{B_2}))$$

subject to, in step 330_4, the overlap factor o, (if o=1 the partition with the minimum total area is always chosen)

$$A(I_{B_1} \cap I_{B_2}) \leq o \cdot (A(I_{B_1}) + A(I_{B_2}))$$

if such a partition exists; alternatively, in step 330_5 the partition is chosen which has the minimum relative overlap, $$\frac{A(I_{B_1} \cap I_{B_2})}{A(I_{B_1}) + A(I_{B_2})}$$

In step 330_6, ties can be adjudicated in favor of rectangle pairs whose total perimeter is minimized. Clearly the rectangles $I_{B_1}$ and $I_{B_2}$ can be computed incrementally as the sweep progresses. Also, this certainly has $N_{B_1} \geq p \cdot N_A$ and $N_{B_2} \geq p \cdot N_A$, as desired.

Preferably, a skew factor of p=0.3 and overlap factor o=1 should be chosen. Note that if o=1 the partition with the minimum total area is always chosen. On the other extreme, if o=0 the constraint is only satisfied by partitions with no overlap. Here, either the partition having the smallest total area without overlap, or the one with the smallest relative overlap is chosen.

Compression

Before describing the compression method itself, FIG. 5 will be used to illustrate the concept of 'collapsing' two nodes. First, two nodes A 501 and B 502 can be collapsed into one node if, as depicted, they have a parent-child relationship. Suppose for example, that node A is the parent of node B. The collapsed node AB 503 has the same ancestor as node A. The children 531 of node AB 503 are the union of the children of node A 501 (excluding B) and the children of node B 502. Note that the child node B 502 has a branch factor of 2, and therefore the branch factor of the new node AB 503 is 1 greater than the branch factor of the original node A 501. In fact, the process always collapses a parent node with a child node having a branch factor of 2, so that the branch factors of the resulting new node will always increase by 1 at a time. In this way it can be certain that collapsing will never result in a node with a branch factor exceeding M.

FIG. 6 depicts a flow chart of the compression step 205 of FIG. 2. As discussed, the order in which the parent nodes are chosen is top-down. Starting at the root, collapsed parent nodes are removed and replaced with the newer nodes unless either their branch factors are full or all children of that node are leaf nodes. In step 400, the binary tree T from the binarization phase is given. In step 405, an ordered list L of the non-leaf nodes of T is created using a breadth-first search. Breadth-first searches are well-known in the art. See, e.g., *Algorithms*, by R. Sedgewick, Addison-Wesley (1983) which is hereby incorporated by reference in its entirety. Note that a reasonable implementation of the binarization process would place the non-leaf nodes in breadth-first order to begin with, so that reordering of the nodes is not necessary. In step 410, if the list of non-leaf nodes L is empty, the compression phase is completed. Otherwise, in step 415, the first node, say A, on list L is selected and removed from L. In step 420, if node A has one or more non-leaf children node, denote B as the non-leaf child of A with the highest leaf number, in step 425. This feature advantageously restricts the amount of skew in the tree. Notice also that this feature automatically guarantees that the chosen child will not be a leaf node, because all children which are leaf nodes will have leaf numbers less than or equal to M, while all non-leaf children will have leaf numbers greater than M. In step 430 collapse nodes A and B to form node AB. In step 435, if the branch factor of AB is less than M, then node AB is added to the front of list L, in step 440. The process repeats, at step 410, for each node in list L, until either all the children of the selected node are leaf nodes (step 420) or the branch factor of the selected node equals M (step 435). At the conclusion of the process, only the penultimate and leaf nodes can have branch factors of less than M.

These features of the compression process advantageously help re-balance the tree created in the binarization step 201. The steps of the compression process is now applied to the structure depicted in FIG. 7 to illustrate this point. Assume the branch factor, M=4. Assume also that the tree 710 is the result of the binarization step 201. Note that nodes A through F are non-leaf nodes, ordered by breadth-first search, while the remaining 7 nodes (G through A) are leaf nodes. In step 720, node A is collapsed into node AB to form tree 730. In step 740, nodes AB and C are collapsed into node ABC, which has a full branch factor of 4 in the resulting tree 750. Thus, the compression process ends for node ABC (see step 435). In step 760, node D is collapsed into penultimate (i.e., it has no non-leaf children) node DF to form tree 770. Although this node DF has a branch factor of 3 (less than M), there are no non-leaf children and the process ends for this node (see step 420). Similarly, node E has a branch factor of 2, but also has no non-leaf children. So, the list becomes empty (see step 410) and the compression process ends. Thus, although the initial binary tree 710 is skewed, the final compressed index tree 770 is relatively well-balanced.

Alternative Embodiments

Those skilled will appreciate that various modifications and improvements are possible within the scope and spirit of the present invention. For example, some alternatives to the basic index tree logic 107 will now be presented. Some of these pertain to the binarization step 201 and some to the compression step 205. In each case, the motivation and the trade-offs are described.

First, the most important need with respect to the basic index tree process is that the leaf nodes are not guaranteed to be packed fully. For example, since the branch factor M is typically large, the number of leaf nodes may dominate the total size of the tree structure. So, this utilization problem is potentially serious, both in terms of performance and tree size. This need can be addressed in the sweep process (described with reference to FIG. 3 and FIG. 4b), by changing the sweep increment from 1 to M (the branch factor), ensuring that the first MBR, always has a multiple of M data objects underneath it. FIG. 8 depicts an example of the sweep process when the sweep increment M is increased to 5. So, sweep over $(1-2 p) \cdot N_A / M$ choices instead of $(1-2 p) \cdot N_A$ choices when minimizing the objective function $A(I_{B_1}) + A(I_{B_2})$. As a result, nearly all nodes will now have a multiple of M data objects, and thus virtually all of the leaf nodes will be fully packed. The computation time of the binarization process is also advantageously reduced by a factor of approximately M. On the other hand, the quality of the optimization solution may be reduced slightly.

Second, the sweep process can be performed in all dimensions, not just the longest. This may improve the solution in terms of the area and overlap, at the expense of perimeter optimization (and computational time). FIG. 8, for example, also shows a sweep process in a second dimension. This y-dimension is the shortest dimension in the example. Yet another alternative would be to use Guttman's linear or quadratic split process (as described in *R-Trees: A Dynamic Index Structure for Spatial Searching*, Proceedings of the ACM SIGMOD Conference (1984), by A. Guttman) suitably modified to obey the rules on partition size. (These two processes were originally proposed to handle insertions in R-trees. Because it is quadratic in the number of data objects, the latter split process may be prohibitively expensive, at least for use at high levels in the binarization process. But some combination of the linear split process at high levels of the tree and the quadratic split process at low levels may constitute a reasonable alternative strategy.)

As noted, choosing a sweep increment of M causes the leaf nodes to be nearly fully utilized. Referring again to FIG. 6, it can be seen that the compression process forces all but the penultimate non-leaf nodes to be fully utilized as well. As shown in tree 740, however, there can be occasional penultimate nodes having very modest branch factors.

FIG. 9a depicts a flowchart of a precompression method in accordance with the present invention for optimizing the utilization of penultimate nodes. FIG. 9b shows an example of an input 910 to and an output 950 from the precompression step on a sample binary tree, with M=3. The precompression process compresses bottom-up one level first and then applies the top-down compression process described in step 205 of FIG. 2. Specifically, in step 915, identify an ancestor node 920 with a leaf number less than or equal to M, but whose parent node 930 has a leaf number greater than M. In step 945, all non-leaf descendants 940 of ancestor node 920 are collapsed into node 920' to form precompressed tree 950.

Now that the present invention has been described by way of a preferred embodiment, with several alternatives, various improvements will occur to those of skill in the art. Thus, it should be understood that the preferred embodiment has been provided as an example and not as a limitation. The scope of the invention is properly defined by the appended claims.

We claim:

1. A computerized method of constructing a tree data structure for indexing multidimensional data objects stored in a computer database, said method comprising the steps of:
constructing a binary tree data structure indexing the multidimensional data objects wherein leaf nodes contain no more than a predetermined maximum number of the multidimensional data objects;
traversing the binary tree from top to bottom and iteratively compressing parent and non-leaf child node pairs into collapsed nodes, each collapsed node having no more than a predetermined maximum fanout for improving page utilization, responsive to said step of constructing; and
storing a compressed data structure in a computer readable memory, responsive to said steps of traversing and compressing.

2. A computerized method as claimed in claim 1, wherein said step of constructing a binary tree comprises the step of:
partitioning the data objects contained in a parent node into a child node pair according to a skew factor which represents a maximum imbalance between a number of data objects contained in a bounding rectangle associated with each child node of the child node pair; and
selecting the child node pair associated with bounding rectangles having a smallest total area subject to an overlap factor limiting an amount of overlap of the bounding rectangles, responsive to said step of partitioning.

3. A computerized method as claimed in claim 2, wherein said step of selecting the child node pair further comprises the step of adjudicating ties by selecting the child node pair associated with the bounding rectangles having a relative minimum total perimeter.

4. A computerized method as claimed in claim 1, wherein said step of constructing the binary tree further comprises the steps of:
creating and maintaining an ordered list of all nodes containing more than the predetermined maximum number of the data objects;
initializing the ordered list to a single node containing all of the data objects; and
iterating the following steps while the ordered list is non-empty:
selecting a parent node from the list; and
partitioning the data objects contained in the parent node into a first child node and a second child node according to a skew factor which represents a maximum imbalance in a number of data objects associated with the first child node and the second child node; and
removing the parent node from the ordered list and adding thereto at least one of the child nodes according to whether they contain more than the predetermined maximum number of the data objects.

5. A computerized method as claimed in claim 4, wherein said step of partitioning comprises the steps of:
ordering centers of the data objects according to a longest dimension in a bounding rectangle corresponding to said parent node;
evaluating all partitions according to the skew factor and for which the number of the centers of the data objects associated with the first child node is a multiple of a predetermined incremental value; and
choosing among said all partitions, one partition associated with bounding rectangles having a smallest total area subject to an overlap factor which constrains an amount of overlap of the bounding rectangles.

6. A computerized method as claimed in claim 5, wherein the predetermined incremental value is one.

7. A computerized method as claimed in claim 5, wherein the predetermined incremental value is equal to the predetermined maximum number of the data objects contained in the leaf node.

8. A computerized method as claimed in claim 5, comprises the steps of:
ordering centers of the data objects according to each dimension in the bounding rectangle corresponding to said parent node; and
said step of choosing among all said partitions is done in said each dimension.

9. A computerized method as claimed in claim 8, wherein said predetermined incremental value is one.

10. A computerized method as claimed in claim 8, wherein said predetermined incremental value is equal to the predetermined maximum number of the data objects in the leaf node.

11. A computerized method as claimed in claim 1, wherein said step of compressing the binary tree further comprises the steps of:
creating and maintaining a list with entries corresponding to non-leaf nodes, in breadth-first order;

iterating the following steps while said ordered list is non-empty:

selecting a parent node from the list;

choosing a child node, associated with the parent node from the list, containing the largest number of data objects and collapsing the child node into the parent node from the list;

removing the parent node from the list and replacing the parent with a revised parent node provided the number of data objects is less than said predetermined maximum number of data objects.

12. A computerized method as claimed in claim 1, comprising the steps of:

finding for each leaf node an ancestor node such that a number of data objects corresponding to said ancestor node is not greater than said predetermined maximum number of data objects but the number of data objects corresponding to a parent of said ancestor node is greater than said predetermined maximum; and collapsing all non-leaf descendants of said ancestor node into said ancestor node, responsive to said step of constructing a binary tree.

13. A tree data structure tangibly fixed in a computer readable memory for indexing multidimensional data objects, said data structure constructed according to a method comprising the steps of claim 1.

14. A computer processing system for constructing a tree data structure which indexes multidimensional data objects stored in a computer database, said system comprising:

binarization means for constructing a binary tree data structure indexing the multidimensional data objects wherein leaf nodes contain no more than a predetermined maximum number of the multidimensional data objects;

compression means, coupled said binarization means, for traversing the binary tree from top to bottom and iteratively compressing parent and non-leaf child node pairs into collapsed nodes, each collapsed node having no more than a predetermined maximum fanout for improving page utilization; and a memory, coupled said binarization means and said compression means, for storing a data structure including the collapsed nodes.

15. A computer processing system as claimed in claim 14, wherein said binarization means comprises:

sweep logic means for partitioning the data objects contained in a parent node into a child node pair according to a skew factor which represents a maximum imbalance between a number of data objects contained in a bounding rectangle associated with each child node of the child node pair, and for selecting the child node pair associated with bounding rectangles having a smallest total area subject to an overlap factor limiting an amount of overlap of the bounding rectangles.

16. A computer processing system as claimed in claim 15, wherein said sweep logic means further comprises means for adjudicating ties by selecting the child node pair associated with the bounding rectangles having a relative minimum total perimeter.

17. A computer processing system as claimed in claim 14, wherein said binarization means further comprises:

means for creating and maintaining an ordered list of all nodes containing more than the predetermined maximum number of the data objects;

means for initializing the ordered list to correspond to a single node containing all of the data objects; and means for iterating the following steps while the ordered list containing said all of the data objects is non-empty:

means for selecting a parent node from the list, and partitioning the data objects contained in the parent node into a first child node and a second child node according to a skew factor which represents a maximum imbalance in a number of data objects associated with the first child node and the second child node; and means for removing the parent node from the ordered list and adding thereto at least one of the child nodes according to whether they contain more than the predetermined maximum number of the data objects.

18. A computer processing system as claimed in claim 17, wherein said sweep logic means comprises:

means for ordering centers of the data objects according to a longest dimension in a bounding rectangle corresponding to said parent node;

means for evaluating all partitions according to the skew factor and for which the number of the centers of the data objects associated with the first child node is a multiple of a predetermined incremental value; and means for choosing among said all partitions, one partition associated with bounding rectangles having a smallest total area subject to an overlap factor which constrains an amount of overlap of the bounding rectangles.

19. A computer processing system as claimed in claim 18, wherein the predetermined incremental value is one.

20. A computer processing system as claimed in claim 18, wherein the predetermined incremental value is equal to the predetermined maximum number of the data objects contained in the leaf node.

21. A computer processing system as claimed in claim 18, wherein said sweep logic comprises:

means for ordering centers of the data objects according to each dimension in the bounding rectangle corresponding to said parent node; and means for choosing among all said partitions in said each dimension.

22. A computer processing system as claimed in claim 21, wherein said predetermined incremental value is one.

23. A computer processing system as claimed in claim 21, wherein said predetermined incremental value is equal to the predetermined maximum number of the data objects in the leaf node.

24. A computer processing system as claimed in claim 14, wherein said compression means further comprises:

means for creating and maintaining a list with entries corresponding to non-leaf nodes, in breadth-first order;

means for iterating the following steps while said ordered list is non-empty:

means for selecting a parent node from the list;

means for choosing a child node, associated with the parent node from the list, containing the largest number of data objects and collapsing the child node into the parent node from the list;

means for removing the parent node from the list and replacing the parent with a revised parent node provided the number of data objects is less than said predetermined maximum number of data objects.

25. A computer processing system as claimed in claim 14, comprising:

precompression means for finding for each leaf node an ancestor node such that a number of data objects corresponding to said ancestor node is not greater than said predetermined maximum number of data objects but the number of data objects corresponding to a parent of said ancestor node is greater than said predetermined maximum; and for collapsing all non-leaf descendants of said ancestor node into said ancestor node, responsive to said step of constructing a binary tree.

26. A program storage device readable by a computer, tangibly embodying a program of instructions executable by the machine to perform method steps for constructing a tree data structure for indexing multidimensional data objects stored in a computer database, said method steps comprising:

constructing a binary tree data structure indexing the multidimensional data objects wherein leaf nodes contain no more than a predetermined maximum number of the multidimensional data objects;

traversing the binary tree from top to bottom and iteratively compressing parent and non-leaf child node pairs into collapsed nodes, each collapsed node having no more than a predetermined maximum fanout for improving page utilization, responsive to said step of constructing; and storing a compressed data structure in a computer readable memory, responsive to said steps of traversing and compressing.

27. A program storage device as claimed in claim 26, wherein said step of constructing a binary tree comprises the step of:

partitioning the data objects contained in a parent node into a child node pair according to a skew factor which represents a maximum imbalance between a number of data objects contained in a bounding rectangle associated with each child node of the child node pair; and selecting the child node pair associated with bounding rectangles having a smallest total area subject to an overlap factor limiting an amount of overlap of the bounding rectangles, responsive to said step of partitioning.

28. A program storage device as claimed in claim 27, wherein said step of selecting the child node pair further comprises the step of adjudicating ties by selecting the child node pair associated with the bounding rectangles having a relative minimum total perimeter.

29. A program storage device as claimed in claim 26, wherein said step of constructing the binary tree further comprises the steps of:

creating and maintaining an ordered list of all nodes containing more than the predetermined maximum number of the data objects;

initializing the ordered list to a single node containing all of the data objects; and iterating the following steps while the ordered list is non-empty:

selecting a parent node from the list; and partitioning the data objects contained in the parent node into a first child node and a second child node according to a skew factor which represents a maximum imbalance in a number of data objects associated with the first child node and the second child node; and removing the parent node from the ordered list and adding thereto at least one of the child nodes according to whether they contain more than the predetermined maximum number of the data objects.

30. A program storage device as claimed in claim 29, wherein said step of partitioning comprises the steps of:

ordering centers of the data objects according to a longest dimension in a bounding rectangle corresponding to said parent node;

evaluating all partitions according to the skew factor and for which the number of the centers of the data objects associated with the first child node is a multiple of a predetermined incremental value; and choosing among said all partitions, one partition associated with bounding rectangles having a smallest total area subject to an overlap factor which constrains an amount of overlap of the bounding rectangles.

31. A program storage device as claimed in claim 30, wherein the predetermined incremental value is one.

32. A program storage device as claimed in claim 30, wherein the predetermined incremental value is equal to the predetermined maximum number of the data objects contained in the leaf node.

33. A program storage device as claimed in claim 30, comprises the steps of:

ordering centers of the data objects according to each dimension in the bounding rectangle corresponding to said parent node; and said step of choosing among all said partitions is done in said each dimension.

34. A program storage device as claimed in claim 33, wherein said predetermined incremental value is one.

35. A program storage device as claimed in claim 33, wherein said predetermined incremental value is equal to the predetermined maximum number of the data objects in the leaf node.

36. A program storage device as claimed in claim 26, wherein said step of compressing the binary tree further comprises the steps of:

creating and maintaining a list with entries corresponding to non-leaf nodes, in breadth-first order;

iterating the following steps while said ordered list is non-empty:

selecting a parent node from the list;

choosing a child node, associated with the parent node from the list, containing the largest number of data objects and collapsing the child node into the parent node from the list;

removing the parent node from the list and replacing the parent with a revised parent node provided the number of data objects is less than said predetermined maximum number of data objects.

37. A program storage device as claimed in claim 26, comprising the steps of:

finding for each leaf node an ancestor node such that a number of data objects corresponding to said ancestor node is not greater than said predetermined maximum number of data objects but the number of data objects corresponding to a parent of said ancestor node is greater than said predetermined maximum; and collapsing all non-leaf descendants of said ancestor node into said ancestor node, responsive to said step of constructing a binary tree.

* * * * *